June 15, 1937.　　　F. J. EISENHARDT　　　2,083,989
BRAKE
Filed March 14, 1935　　　2 Sheets-Sheet 1

INVENTOR.
FRANK J. EISENHARDT
BY Harry H. Hitzeman
ATTY.

June 15, 1937.  F. J. EISENHARDT  2,083,989
BRAKE
Filed March 14, 1935  2 Sheets-Sheet 2
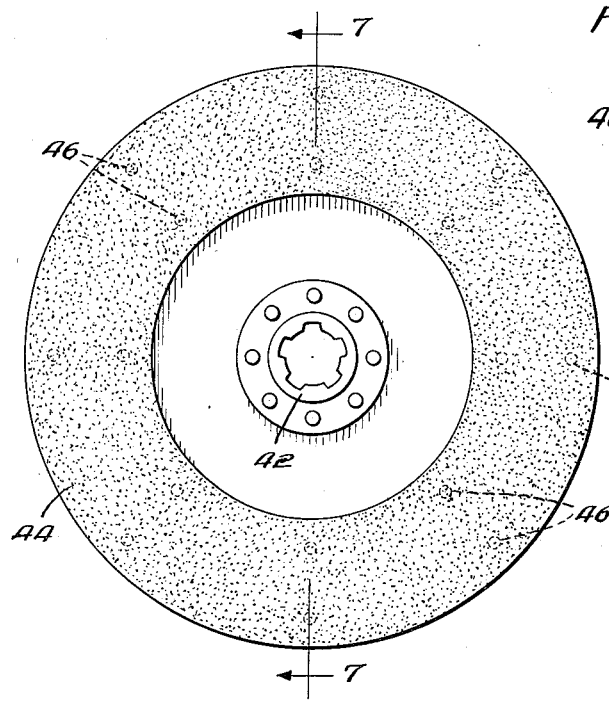
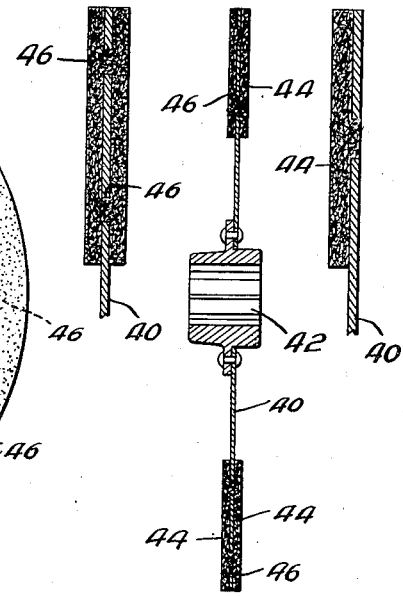
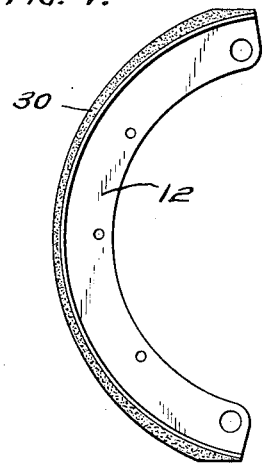
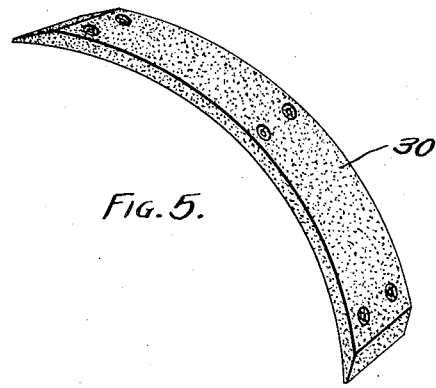
INVENTOR.
FRANK J. EISENHARDT
BY
Harry H. Hitzeman
ATTY.

Patented June 15, 1937

2,083,989

UNITED STATES PATENT OFFICE 2,083,989

BRAKE

Frank J. Eisenhardt, Warsaw, Ind., assignor to Hoof-Brak Corporation, a corporation of Illinois Application March 14, 1935, Serial No. 11,157

6 Claims. (Cl. 106—23)

My invention relates to brakes, brake linings, friction linings, clutch linings and similar materials.

My invention relates more particularly to improvements in devices of the type specified and to the class of different materials known as molded as contrasted with woven friction material.

An object of the invention is to provide an improved composition of material which possesses a relatively high coefficient of friction and which is capable of resisting the heat tendency thereof due to the friction generated between the material and a band, disc, or other object with which it cooperates.

A further object is to provide a composition of material of the friction resisting type which will be substantially fireproof and water proof and which will have high wear resisting qualities without lessening its frictional qualities.

A further object of the present invention is to provide a molded composition material of the type described, capable of being molded upon brake shoes, clutch discs or other objects with which it cooperates.

A further object of my invention is to provide a composition of materials for use as friction resisting material that is almost entirely composed of inorganic ingredients.

A further object of the invention is to provide this material in such form that it is capable of being molded upon backing objects during one step in its manufacture.

Other objects and advantages will be more apparent from the following description, together with the accompanying two sheets of drawings wherein I have illustrated several preferred embodiments of my invention.

In the drawings, Fig. 1 is a front elevational view of a set of brake shoes equipped with my improved lining shown in place within a circular brake drum;

Fig. 4 is a perspective view of a brake shoe and lining;

Fig. 5 is a perspective view of a modified form of my improved lining;

Fig. 6 is an elevational view of a clutch disc to which my improved friction material has been applied;

Fig. 7 is a vertical sectional view thereof, taken generally on the lines 7—7 of Fig. 6;

Fig. 8 is an enlarged fragmentary section of a portion of Fig. 7; and

Fig. 9 is a similar sectional view of a modified form of clutch disc and facing.

Figure 1:
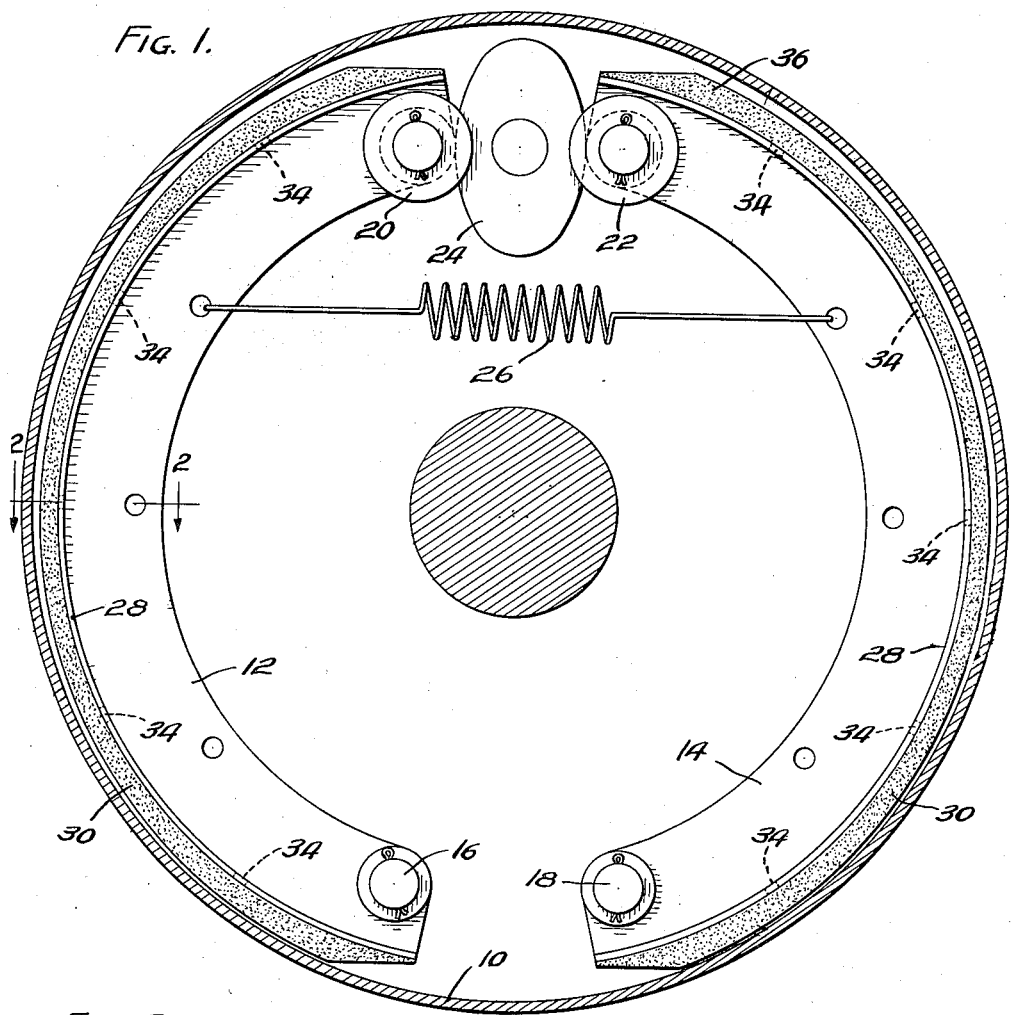
Figure 3:
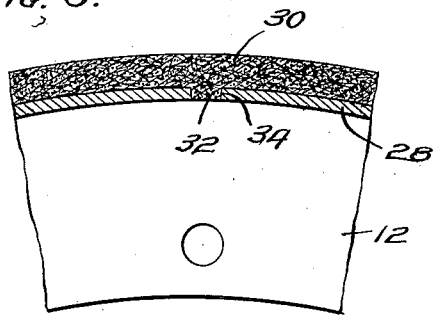
Fig. 3 is a vertical sectional view of the brake shoe and lining, taken generally on the lines 3—3 of Fig. 2.
Figure 2:
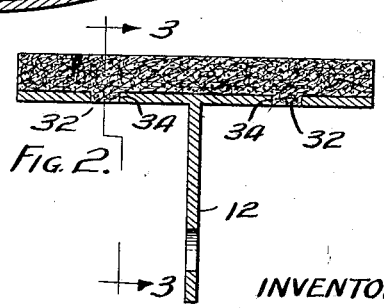
Fig. 2 is a cross-sectional view through the brake shoe and lining taken generally on the lines 2—2 of Fig. 1.

In the drawings, I have illustrated a typical automobile brake assembly which may include the brake drum 10 and a pair of brake shoe members 12 and 14 suitably mounted at their lower ends upon pivots 16 and 18. The brake shoes are provided at their upper extremities with a pair of roller members 20 and 22 normally engaging a brake operating cam 24. A spring member 26 is adapted to return the brake shoes to normal position upon releasing the brakes.

The construction thus far described is that normally shown in modern brakes. Upon the peripheral face 28 of the brake shoes 12 and 14 I provide a brake lining 30. This brake lining may be composed of inorganic material capable of being molded directly upon the shoe with the portions 32 thereof entering into the openings 34 about the periphery of the face 28.

It is a well-known fact to brake engineers that the forward edges 36 of brake linings are ordinarily worn first, due to the gripping of the brake drum at these points in the normal operation of brakes. Accordingly, I have provided brake linings which are of a larger diameter than the periphery of the shoes 12 and 14 so that at their extremities the brake linings will be thicker than at an intermediate point. I have found that providing brake linings thus constructed that longer life is given to the brakes due to the provision of more material at the points of hardest wear.

The molded brake material which I employ is composed of from 90 to 100% inorganic ingredients. I have found that a mixture of asbestos fibre, sodium silicate, clay, graphite and zinc oxide, forms an inorganic mass capable of being formed into ribbons or sheets of required width and thickness. I have further found that this material, after drying, may be molded on the shoe, after which it may be subjected to a heat treatment which sets up a reaction in the materials above mentioned and provides as a finished product a brake material of great heat resistance that is impervious to water, oil, grease or acids.

I have further found that, due to the mechanical changes which result in the heat treatment after the lining has been applied to a brake shoe or similar backing, the same is adhered very effectively to the same, and is incapable of being removed or torn loose by ordinary wear or use.

One satisfactory mixture of the foregoing ingredients may be in the following proportions:

| | Parts by weight |
|---|---|
| Asbestos fibre | 33⅓ |
| Sodium silicate | 33⅓ |
| Clay | 22 |
| Graphite | 8 |
| Zinc oxide | 3⅓ |

I have also found that suitable mixtures of these ingredients may be composed of the following:

| | Parts by weight |
|---|---|
| Asbestos fibre | 25 to 40 |
| Sodium silicate | 25 to 40 |
| Clay | 15 to 30 |
| Graphite | 10 to 12 |
| Zinc oxide | 2 to 4 |

I have further found by thorough experiment that brake linings composed of the ingredients mentioned hereinbefore may possibly have too great a coefficient of friction for some industrial purposes and, accordingly, I have provided a further mixture of ingredients in the following proportions:

| | Parts |
|---|---|
| Asbestos fibre | 33 |
| Sodium silicate | 30 |
| Clay | 16 |
| Graphite | 8 |
| Zinc oxide | 3 |
| Rubber | 10 |

I have found that a brake or friction lining constructed of a composition of materials as above set forth has a lesser coefficient of friction than the composition hereinbefore described.

In Figs. 6 to 9 I have illustrated a further adaptation of my friction lining for use as a clutch facing. I provide the usual clutch disc 40 provided with a suitable hub member 42. Upon both sides of the disc 40 I have provided a layer of friction material 44. The same may be adhered thereto in the manner previously described and by pressing the material through the radial opening 46 in the disc 40. In Fig. 9, I have illustrated a modified form of clutch disc 40 in which I have shown the friction material 44 applied to only one surface thereof.

One of the principal achievements of my invention has been to adhere brake material to a rough casting. By the use of my friction material, it is not necessary to machine off the surfaces of the face portions 28 of the brake shoes nor is it necessary to machine the surface of discs 40 of clutch members. Accordingly, the saving in workmanship in manufacturing brake shoes and linings is easily understood.

While I have illustrated and described my invention with particular reference to brake linings and clutch facings, it will, of course, be obvious to those skilled in the art that the brake or friction material which I have invented is capable of wide and varied use and is not necessarily limited to the uses herein disclosed. My invention is capable of wide use and I do not wish to be limited in any particular, rather, what I desire to secure and protect by Letters Patent of the United States is:

1. A friction material comprised of by weight approximately ⅓ asbestos fibre, ⅓ sodium silicate, and clay, graphite, zinc oxide, and rubber in suitable proportion.

2. A composition for friction material comprised of by weight 33⅓ parts of asbestos fibre, 33⅓ parts of sodium silicate, 22 parts of clay, 8 parts of graphite, and 3⅓ parts of zinc oxide.

3. A friction material comprised of a mixture of material in the following proportions: 25 to 40 parts of asbestos fibre, 25 to 40 parts of sodium silicate, 15 to 30 parts of clay, 10 to 12 parts graphite, and 2 to 4 parts of zinc oxide.

4. A friction material consisting of a mixture of material by weight in the following proportions:

| | Parts |
|---|---|
| Asbestos fibre | 33 |
| Sodium silicate | 30 |
| Clay | 16 |
| Graphite | 8 |
| Zinc oxide | 3 |
| Rubber | 10 |

5. A friction material consisting of a mixture of materials by weight in the following proportions: 25 to 40 parts of asbestos fibre, 25 to 40 parts of sodium silicate, 10 to 20 parts of clay, 5 to 15 parts of rubber, and graphite and zinc oxide in equal proportions.

6. A friction material comprised of by weight ⅓ asbestos fibre, ⅓ sodium silicate and portions of clay, graphite and zinc oxide.

FRANK J. EISENHARDT.